United States Patent [19]

Thaniyavarn

[11] Patent Number: 4,714,312
[45] Date of Patent: Dec. 22, 1987

[54] ELECTROSTATICALLY BIASED ELECTROOPTICAL DEVICES

[75] Inventor: Suwat Thaniyavarn, Pasadena, Calif.

[73] Assignee: TRW Inc., Redondo Beach, Calif.

[21] Appl. No.: 864,231

[22] Filed: May 19, 1986

[51] Int. Cl.$^4$ ............................................... G02B 6/12
[52] U.S. Cl. ................................. 350/96.14; 350/96.11; 350/320
[58] Field of Search ............... 350/96.11, 96.12, 96.13, 350/96.14, 320

[56] References Cited

U.S. PATENT DOCUMENTS 4,427,260 1/1984 Puech et al. .................. 350/96.14

FOREIGN PATENT DOCUMENTS 0021843 2/1977 Japan .................. 350/96.14

Primary Examiner—John Lee
Assistant Examiner—John Ngo
Attorney, Agent, or Firm—Noel F. Heal; Thomas N. Giaccherini

[57] ABSTRACT

A structure and a corresponding method for producing a permanent electric biasing field in an electrooptical device. Electrodes are embedded in an insulating layer formed over the device, which includes a substrate of electrooptical material and an optical waveguide formed in the substrate. The electrodes are electrostatically charged and encapsulated in the insulating layer, to produce the desired electric field without the need for an external voltage source.

6 Claims, 3 Drawing Figures

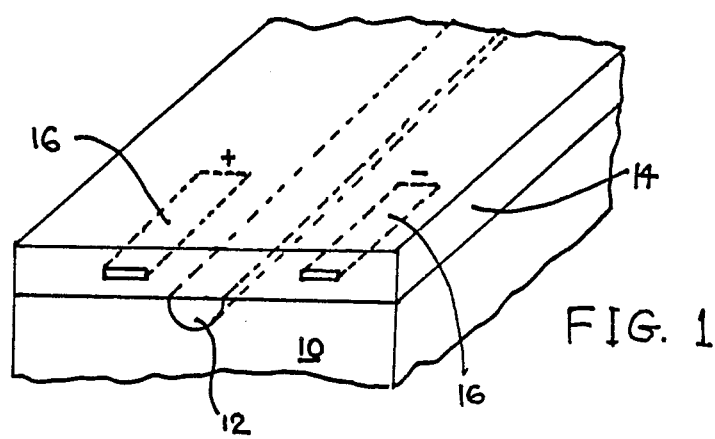
FIG. 1
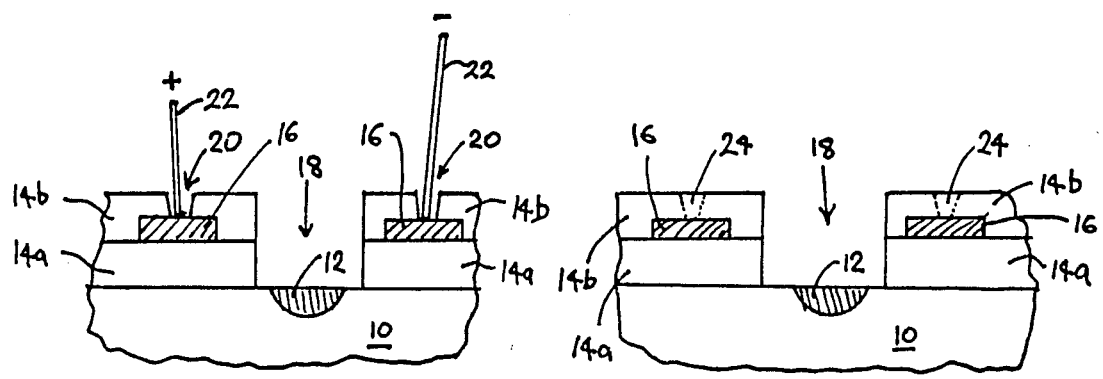
FIG. 2a
FIG. 2b

ELECTROSTATICALLY BIASED ELECTROOPTICAL DEVICES

BACKGROUND OF THE INVENTION

This invention relates generally to electrooptical devices and, more specifically, to a novel technique for providing an electrical bias in such devices. In recent years, devices have been developed to make use of an electrooptical effect in which an electric field induces a change in refractive index of an electrooptic crystal. An optical field propagating in a waveguide formed in the crystal is phase modulated by the induced change in refractive index. The electrooptical effect can be used in devices such as modulators and switches.

Most electrooptical devices using phase modulation require some kind of biasing structure to produce an electric field that compensates for differences in propagation constants and other differences arising from difficulties with manufacturing tolerances. Biasing is also needed to bring the device to a desired operating point in its phase modulation characteristic. The use of biasing for phase tuning allows the device to achieve low cross-talk, in the case of electrooptical switches, and low harmonic distortion, in the case of electrooptical modulators.

Prior to this invention, phase tuning involved loading the waveguides with dielectric or metal films. Precise phase tuning by this technique is very difficult, since the resultant phase shifts cannot be precisely determined in advance of fabrication and cannot be subsequently tuned. A more reliable technique is to supply a biasing field with an additional pair of electrodes and an external voltage source. This approach increases the circuit complexity, and the requirement for an external voltage source is usually a significant inconvenience.

Accordingly, there is still a need for another, more convenient technique for supplying a biasing electric field in an electrooptical device. The present invention satisfies this need.

SUMMARY OF THE INVENTION

The present invention resides in the use of an electrostatic field to phase tune an electrooptical device. Briefly, and in general terms, the structure of the invention comprises an electrooptical substrate, an optical waveguide formed in the substrate, an insulating layer formed over the substrate, and a pair of metal electrodes embedded within the insulating layer and bearing opposite electrostatic charges, to generate a desired electric biasing field influencing the waveguide.

In terms of a novel method of manufacturing a biased electrooptical device, the invention includes the steps of forming an insulating layer over an electrooptical device having a waveguide formed in an electrooptical substrate, embedding a pair of metal electrodes in the insulating layer, applying an electrostatic charge to the electrodes, and sealing the electrodes with additional insulating material. In the preferred form of this method, the electrodes are first covered with insulating material, and then a small opening is made over each electrode, to admit a voltage probe. A bias voltage is applied to the probes, and is adjusted to achieve the desired biasing effect. Then the probes are removed and the openings are sealed to complete the encapsulization of the electrodes. Electrical charge remains on the electrodes and leaks off only at an extremely slow rate. Accordingly, the electrodes continue to provide the desired biasing effect without the need for an external voltage source.

It will be appreciated from the foregoing that the present invention represents a significant advance in the field of electrooptical devices. In particular, the invention provides a convenient technique for supplying a biasing electric field without the inconvenience of a voltage source. Other aspects and advantages of the invention will become apparent from the following more detailed description, taken in conjunction with the accompanying drawings.

BRIEF DESCRIPTION OF THE DRAWINGS

FIG. 1 is a simplified perspective view of a portion of an electrooptical device constructed in accordance with the invention;

FIG. 2a is a simplified sectional view of an electrooptical device in accordance with the invention, showing voltage probes installed for the purpose of applying electric charge to the electrodes; and FIG. 2b is a view similar to FIG. 2a, but showing the voltage probes removed and the electrodes totally encapsulated.

DESCRIPTION OF THE PREFERRED EMBODIMENT

As shown in the drawings for purposes of illustration, the present invention is concerned with electrooptical devices that require a biasing electric field to be present for their proper operation. Electrooptical devices employ an effect known as the electrooptical effect, in which an electric field induces a change in refractive index of an electrooptic crystal. An optical field propagating in a waveguide formed in the crystal is phase modulated by the induced change in refractive index. The electrooptical effect can be used in devices such as modulators and switches.

Many electrooptical devices require some kind of biasing structure to produce an electric field for purposes of fine-tuning the phase or to bias the device to a desired operating point. The use of biasing for phase tuning allows the device to achieve low cross-talk, in the case of electrooptical switches, and low harmonic distortion, in the case of electrooptical modulators. In the past, biasing has required the use of an external voltage source to produce the desired electric field.

In accordance with the invention, a biasing electric field is produced in an electrooptical device by means of a pair of electrodes that are electrostatically charged and encapsulated in an insulating material. As shown in FIG. 1, an electrooptical device comprises a substrate of electrooptical material, such as lithium niobate (LiNbo$_3$), indicated by reference numeral 10, and an optical waveguide 12 formed on the substrate. The waveguide 12 is typically formed by in-diffusion of titanium (Ti). Electrooptical devices perform various functions, such as modulation and switching, by applying an electric field to the waveguide 12, but there is a common requirement for a biasing electric field to be applied to the waveguide.

In the structure of the invention illustrated in FIG. 1, an insulating layer 14 is formed over the substrate 10 and the waveguide 12, and a pair of electrodes 16 are embedded in the insulating layer, and charged with a controlled amount of electric charge. The electrodes 16 are positioned in such a manner with respect to the waveguide 12 that the charged electrodes produce an electric field of the desired strength and direction to bias the device for its intended use.

FIGS. 2a and 2b show a technique that can be used to charge the electrodes 16. The structure is first covered with a first stage 14a of the insulating layer 14, which may later have the portion immediately above the waveguide 12 etched away, as indicated at 18. The insulating material may be, for example, silicon dioxide ($SiO_2$). Embedding the electrodes in the layer 14 is accomplished by applying the insulating layer 14 in two stages, with the electrodes being positioned over the first-stage layer 14a and then covered by a second-stage layer 14b. To apply a desired charge to the electrodes 16, a small opening 20 is made over each electrode, to admit voltage probes 22, which make contact with the electrodes. The device is then operated in its normal mode, which may be, for example, phase modulation, and a bias voltage is applied through the probes 22 and is adjusted until the desired operating characteristics are obtained. Then the voltage probes 22 are removed, and the openings 20 are sealed with more insulating material, as indicated at 24 in FIG. 2b.

After removal of the probes 22 and complete sealing of the electrodes 16 from the atmosphere, the electrical charge that was on the electrodes when the probes were removed remains on the electrodes. The charge will dissipate only after a very long period of time, measured in years, and the device will provide the appropriate biasing electric field without the need for an external voltage source. Since the device does not draw current from the electrodes in maintaining a bias field, the only source of dissipation of the field is by charge leakage through the surrounding insulating layer 14. With appropriate choice of materials and thickness of layers, this leakage is extremely small.

It will be appreciated from the foregoing that the present invention represents a significant advance in the field of electrooptical devices. In particular, the invention provides a novel technique for providing a biasing electric field without the need for an external voltage source. This approach is not only convenient from a user standpoint, but the complexity of the device's circuitry is greatly reduced and high-speed operation is facilitated. It will also be appreciated that, although an embodiment of the invention has been described in detail for purposes of illustration, various modifications may be made without departing from the spirit and scope of the invention. Accordingly, the invention is not to be limited except as by the appended claims.

I claim:

1. An electrooptical device, comprising:
   an electrooptical substrate;
   an optical waveguide formed in the substrate;
   an insulating layer formed over the substrate; and
   a pair of metal electrodes embedded within the insulating layer, the electrodes being completely enclosed within the insulating layer and bearing opposite electrostatic charges, to generate a desired electric biasing field to influence the waveguide, without requiring an external voltage source.

2. An electrooptical device as defined in claim 1, wherein:
   the substrate is of lithium niobate;
   the optical waveguide is of in-diffused titanium; and
   the insulator is silicon dioxide.

3. A method of producing a permanent electric biasing field in an electrooptical device, the method comprising the steps of:
   applying an insulating layer over the electrooptical device, which includes a substrate and an optical waveguide;
   embedding a pair of electrodes in the insulating layer, the electrodes being completely enclosed by the insulating material; and
   applying opposite electrostatic charges to the electrodes, to produce the desired electric biasing field, without requiring an external voltage source.

4. A method as defined in claim 3, wherein the step of embedding the electrodes includes:
   installing the electrodes over a first insulating layer; and
   applying a second insulating layer over the first and over the electrodes.

5. A method of producing a permanent electric biasing field in an electrooptical device, the method comprising the steps of:
   applying an insulating layer over the electrooptical device, which includes a substrate and an optical waveguide;
   embedding a pair of electrodes in the insulating layer; and
   applying opposite electrostatic charges to the electrodes, to produce the desired electric biasing field, the step of applying opposite electrostatic charges further including the steps of:
   forming an opening over each electrode;
   inserting a voltage probe into each opening to make contact with the electrode;
   applying a voltage across the voltage probes;
   adjusting the voltage across the voltage probes until a desired operating characteristic is obtained for the device;
   removing the voltage probes; and
   sealing the openings with additional insulating material.

6. A method of producing a permanent electric biasing field in an electrooptical device, the method comprising the steps of:
   applying an insulating layer over the electrooptical device, which includes a substrate and an optical waveguide;
   embedding a pair of electrodes in the insulating layer, the step of embedding the electrodes further including the steps of:
   installing the electrodes over a first insulating layer; and
   applying a second insulating layer over the first and over the electrodes; and
   applying opposite electrostatic charges to the electrodes, to produce the desired electric biasing field, the step of applying opposite electrostatic charges further including the steps of:
   forming an opening over each electrode;
   inserting a voltage probe into each opening to make contact with the electrode;
   applying a voltage across the voltage probes;
   adjusting the voltage across the voltage probes until a desired operating characteristic is obtained for the device;
   removing the voltage probes; and
   sealing the openings with additional insulating material.

* * * * *